United States Patent
Bohres et al.

(10) Patent No.: US 10,982,132 B2
(45) Date of Patent: Apr. 20, 2021

(54) PROCESS OF FRACTURING SUBTERRANEAN FORMATIONS WITH WATER-SOLUBLE LAYERED SILICATE

(71) Applicant: BASF SE, Ludwigshafen am Rhein (DE)

(72) Inventors: Edward Bohres, Ludwigshafen am Rhein (DE); Radoslaw Kierat, Ludwigshafen am Rhein (DE); Stephan Schunk, Heidelberg (DE); Carlos Lizandara Pueyo, Ludwigshafen am Rhein (DE); Sven Titlbach, Heidelberg (DE); Robert Mueller, Heidelberg (DE); Michael Ludwig Lejkowski, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 88 days.

(21) Appl. No.: 16/311,015

(22) PCT Filed: Jun. 14, 2017

(86) PCT No.: PCT/EP2017/064491
§ 371 (c)(1),
(2) Date: Dec. 18, 2018

(87) PCT Pub. No.: WO2017/220391
PCT Pub. Date: Dec. 28, 2017

(65) Prior Publication Data
US 2020/0317994 A1 Oct. 8, 2020

(30) Foreign Application Priority Data

Jun. 23, 2016 (EP) .................................. 16175899

(51) Int. Cl.
*E21B 43/26* (2006.01)
*C09K 8/68* (2006.01)
(Continued)

(52) U.S. Cl.
CPC .............. *C09K 8/685* (2013.01); *C09K 8/706* (2013.01); *C09K 8/80* (2013.01); *E21B 43/26* (2013.01); *C09K 2208/24* (2013.01)

(58) Field of Classification Search
None
See application file for complete search history.

(56) References Cited

U.S. PATENT DOCUMENTS

| 4,664,839 A | 5/1987 | Rieck |
| 5,356,607 A | 10/1994 | Just |

(Continued)

FOREIGN PATENT DOCUMENTS

| EP | 164514 A1 | 12/1985 |
| EP | 1331358 A1 | 7/2003 |

(Continued)

OTHER PUBLICATIONS

"SUPBENT® MP—Synthetic Hectorite"; FCC Inc.; <http://www.nanoclay.net/sdp/96374/4/pd-998444/204501-2098461/SUPBENT_MP_Synthetic_Hectorite.html>; accessed Aug. 12, 2020.*

(Continued)

*Primary Examiner* — Andrew Sue-Ako
(74) *Attorney, Agent, or Firm* — Faegre Drinker Biddle & Reath LLP (57) ABSTRACT

Method of fracturing a subterranean formation by injecting an aqueous fracturing fluid comprising an aqueous base fluid, a polysaccharide and/or polysaccharide derivative, a crosslinker, which is a water-soluble, layered silicate and a proppant. Aqueous fracturing fluid comprising an aqueous base fluid, a polysaccharide and/or polysaccharide deriva- (Continued)

Measuring position tive, a crosslinker, which is a water-soluble, layered silicate and a proppant and to the use of water-soluble, layered silicates as crosslinker for aqueous fracturing fluids comprising polysaccharides and/or polysaccharide derivatives.

19 Claims, 2 Drawing Sheets

(51) Int. Cl.
    *C09K 8/70*     (2006.01)
    *C09K 8/80*     (2006.01)

(56) References Cited

U.S. PATENT DOCUMENTS

| | | | |
|---|---|---|---|
| 5,962,258 A | 10/1999 | Mathur et al. | |
| 6,008,032 A | 12/1999 | Mathur et al. | |
| 6,245,547 B1 | 6/2001 | Mathur et al. | |
| 6,310,008 B1 * | 10/2001 | Rietjens | C09K 8/685 166/308.5 |
| 7,807,433 B2 | 10/2010 | Bylina et al. | |
| 10,240,081 B2 * | 3/2019 | Shchepelina | C09K 8/887 |
| 2004/0067854 A1 | 4/2004 | Dobson, Jr. et al. | |
| 2004/0108113 A1 | 6/2004 | Luke et al. | |
| 2012/0048548 A1 | 3/2012 | Crews et al. | |
| 2014/0090848 A1 * | 4/2014 | Li | C09K 8/52 166/308.1 |
| 2014/0148369 A1 * | 5/2014 | Tang | C09K 8/68 507/211 |

FOREIGN PATENT DOCUMENTS

| | | |
|---|---|---|
| EP | 2738233 A1 | 6/2014 |
| WO | WO-9108171 A1 | 6/1991 |
| WO | WO-9947624 A1 | 9/1999 |
| WO | WO-2005040301 A1 | 5/2005 |
| WO | WO-2009020459 A2 | 2/2009 |
| WO | WO-2009111324 A1 | 9/2009 |
| WO | WO-2010140033 A2 | 12/2010 |
| WO | WO-2012122505 A2 | 9/2012 |
| WO | WO-2013029864 A1 | 3/2013 |
| WO | WO-2013148163 A1 | 10/2013 |
| WO | WO-2014108350 A1 | 7/2014 |
| WO | WO-2015020668 A1 | 2/2015 |
| WO | WO-2015039032 A1 | 3/2015 |

OTHER PUBLICATIONS

Barati, R., et al., "A Review of Fracturing Fluid Systems Used for Hydraulic Fracturing of Oil and Gas Wells", Journal of Applied Polymer Science, vol. 131, No. 16, (2014), pp. 1-11.

Dany, F., et al., "Kristallines Schichtsilikat—ein neuer Builder", Seifen-Öle-Fette-Wachse, vol. 116, No. 20, (1990), pp. 805-808 (in German).

Extended European Search Report for EP Patent Application 16175899.0 dated Jun. 6, 2017.

International Search Report for PCT/EP2017/064491 dated Aug. 28, 2017.

Written Opinion of the International Searching Authority for PCT/EP2017/064491 dated Aug. 28, 2017.

* cited by examiner

Figure 1:
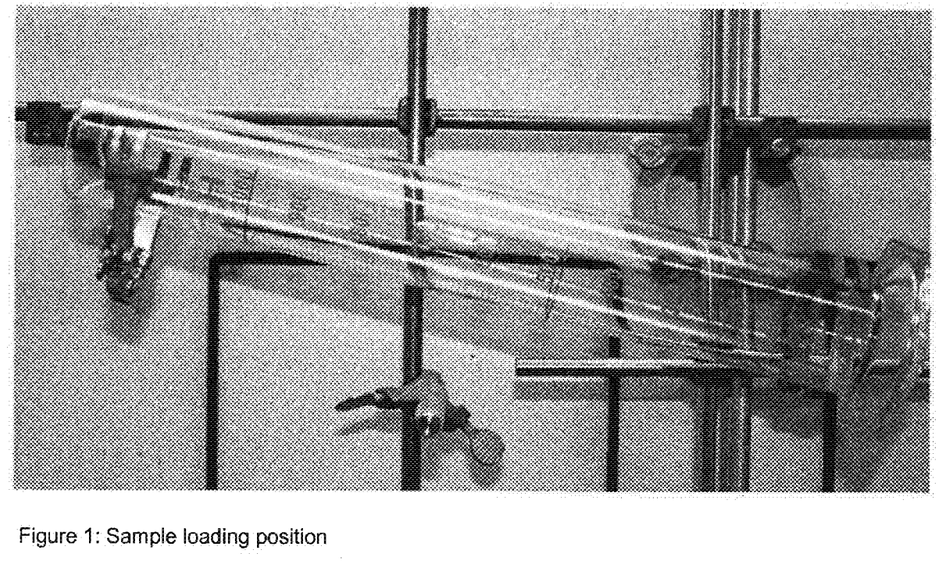

Figure 1: Sample loading position

Figure 2:
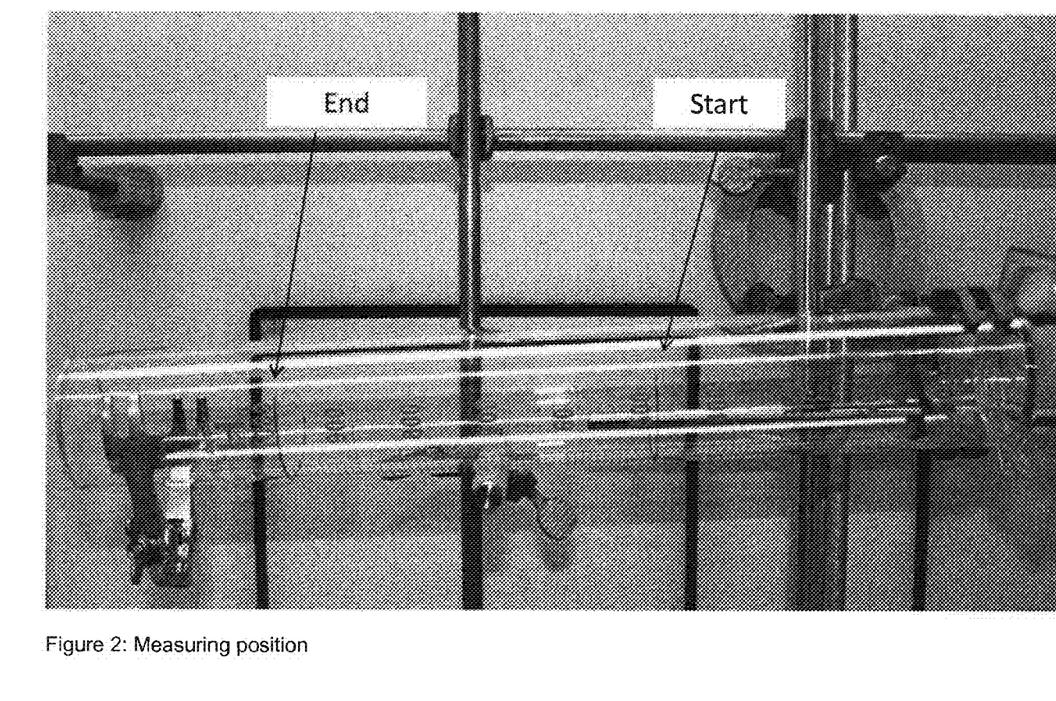

Figure 2: Measuring position

PROCESS OF FRACTURING SUBTERRANEAN FORMATIONS WITH WATER-SOLUBLE LAYERED SILICATE

CROSS-REFERENCE TO RELATED APPLICATIONS

This application is a national stage application (under 35 U.S.C. § 371) of PCT/EP2017/064491, filed Jun. 14, 2017, which claims benefit of European Application No. 16175899.0, filed Jun. 23, 2016, both of which are incorporated herein by reference in their entirety.

The present invention relates to a method of fracturing a subterranean formation by injecting an aqueous fracturing fluid comprising an aqueous base fluid, a polysaccharide and/or polysaccharide derivative, a crosslinker, which is a water-soluble, layered silicate and a proppant. The invention furthermore relates to an aqueous fracturing fluid comprising an aqueous base fluid, a polysaccharide and/or polysaccharide derivative, a crosslinker, which is a water-soluble, layered silicate and a proppant and to the use of water-soluble, layered silicates as crosslinker for aqueous fracturing fluids comprising polysaccharides and/or polysaccharide derivatives.

Hydraulic fracturing is a common technology to stimulate the production of hydrocarbons and/or gas. It involves injecting suitable fracturing fluids through a wellbore and into subterranean formations under sufficiently high pressure to create fractures, thereby providing channels through which formation fluids such as oil, gas or water, can flow into the wellbore and thereafter be withdrawn. Typically, fracturing fluids comprise an aqueous base fluid, thickening components such as thickening polymers and/or thickening surfactants, and a proppant. Proppants are small, hard particles such as naturally-occurring sand grains, resin-coated sand, sintered bauxite, glass beads, polymer beads and the like. It is their aim to keep the fracture open when the pressure is released.

An overview about fracturing fluid systems may be found—for example—in Reza Baratiand Jenn-Tai Liang in "*A Review of Fracturing Fluid Systems used for Hydraulic Fracturing of Oil and Gas Wells*", *J. Appl. Polym. Sci.* 2014, DO: 10.1002/APP.407335. One of the most common fluids for fracturing comprises guar gum as thickening polymer, a crosslinker, and proppants. As crosslinker Ti(IV), Zr(IV), Al(III) ions, or borates may be used. Borates may be provided as borax or boric acid, but also as boron minerals such as colemanite or ulexite or as organoborates.

It is known in the art to use clays as component of fluids for various oilfield use. Such fluids are disclosed, for example, in WO 99/47624 A1, WO 2005/040301 A1, WO 2009/111324 A1, WO 2013/029864 A1, US 2004/0108113 A1, or US 2004/0067854 A1.

WO 2012/122505 A2 discloses a method of forming a wellbore fluid comprising introducing a hydratable polymer and a crosslinker comprised of at least a silica material, the crosslinker having a dimension of 5 nm to 100 nm. The hydratable polymers may be natural or synthetic polymers. The silica material may be a borosilicate. The wellbore fluid may be used for hydraulic fracturing.

Fracking is highly controversial in many countries, and consequently there is a high demand for "green fracturing fluids". There are in particular concerns against the use of borates as crosslinkers and there is a need for alternatives to borates which have a similar performance but for which there are no concerns and which are as cheap as borates.

It was an objective of the present invention to provide such alternatives to borates as crosslinkers in fracturing fluids.

Surprisingly, said objective may be solved by using certain water-soluble, layered silicates which are known for use in the field of detergents.

Correspondingly, in a first embodiment of the invention a method of fracturing a subterranean formation penetrated by a wellbore has been found, which at least comprises at least injecting an aqueous fracturing fluid comprising at least
(A) an aqueous base fluid,
(B) a polysaccharide and/or polysaccharide derivative,
(C) a crosslinker, and
(D) a proppant
into at least a wellbore at a rate and pressure sufficient to penetrate into the formation and to initiate or extend fractures in the formation, wherein the crosslinker is a water-soluble, layered silicate In a second embodiment of the invention an aqueous fracturing fluid has been found, comprising at least
(A) an aqueous base fluid,
(B) a polysaccharide and/or polysaccharide derivative,
(C) a crosslinker, and
(D) a proppant,
wherein the crosslinker is a water-soluble, layered silicate.

In a third embodiment of the invention the use of water-soluble, layered silicates as crosslinkers in aqueous fracturing fluids comprising polysaccharides and/or polysaccharide derivatives has been found.

In a preferred embodiment of the invention, the water-soluble, layered silicate has the general formula $NaMSi_xO_{2x+1}*yH_2O$, wherein M is an ion selected from the group of alkali metal ions and/or a proton, x is a number from 1.9 to 22 and y is a number from 0 to 30.

In a preferred embodiment of the invention the polysaccharide and/or polysaccharide derivative (B) is guar and/or a guar derivative.

With regard to the invention, the following should be stated specifically:

For the method according to the present invention an aqueous fracturing fluid comprising at least an aqueous base fluid (A), at least a polysaccharide and/or a polysaccharide derivative (B), at least one crosslinker (C) and at least proppant (D). Besides said components also further components may be present in the fracturing fluid.

Aqueous Base Fluid (A)

The aqueous base fluid for the fracturing fluid comprises water. The water may be fresh water, sea water or formation water or mixtures thereof. It is preferred to use fresh water.

The aqueous base fluid may comprise dissolved salts. Examples of salts comprise halogenides, in particular chlorides, sulfates, borates of mono- or divalent cations such as $Li^+$, $Na^+$, $K^+$, $Mg^{2+}$, $Ca^{2+}$, $Sr^{2+}$, or $Ba^{2+}$.

Besides water, the aqueous formulation may also comprise organic solvents miscible with water. Examples of such solvents comprise alcohols such as ethanol, n-propanol, i-propanol or butyldiglycol. If organic solvents are present, their amount should not exceed 50% by weight with respect to the solvents present in the aqueous base fluid. In a preferred embodiment of the invention, the aqueous base fluid comprises at least 70% by weight of water with respect to the solvents present in the aqueous base fluid, more preferably at least 90% by weight. In a further preferred embodiment of the invention, only water is used as solvent in the aqueous base fluid.

Polysaccharide and/or Polysaccharide Derivative (B)

The aqueous fracturing fluid furthermore comprises at least one polysaccharide and/or polysaccharide derivative. Of course, also a mixture of two or more polysaccharides and/or polysaccharide derivatives may be used. The polysaccharides and/or polysaccharide derivatives are water-soluble and act as thickeners for the aqueous fracturing fluid. The thickening effect may be enhanced by using crosslinkers (C).

Examples of suitable polysaccharide and/or polysaccharide derivatives comprise xanthan, scleroglucane, galactomannan gums or cellulose derivatives.

Galactomannan gums comprise a backbone of mannose units with various amounts of galactose units attached thereto. In certain embodiments, the ratio of mannose/galactose may be from 1.6 to 2, for example from 1.6 to 1.8. The galactose units may be distributed regularly or randomly along the backbone. In certain embodiments, the average molecular weight $M_w$ may be from 1,000,000 g/mol to 2,000,000 g/mol.

Examples of suitable galactomannan gums include gum arabic, gum ghatti, gum karaya, tamarind gum, tragacanth gum, guar gum, or locust bean gum. Examples of derivatives include hydroxyethylguar, hydroxypropylguar, carboxymethylguar, carboxymethyl hydroxyethylguar and carboxymethyl hydroxypropylguar.

Examples of suitable cellulose derivatives include hydroxyethyl cellulose, carboxyethylcellulose, carboxymethylcellulose, or carboxymethylhydroxyethylcellulose.

In one embodiment of the invention, the polysaccharide and/or polysaccharide derivative is guar gum and/or a guar gum derivative. In a preferred embodiment, the polysaccharide and/or polysaccharide derivative is carboxymethyl hydroxypropyl guar.

In certain embodiments the amount of carboxymethyl groups in carboxymethyl hydroxypropyl guar expressed as degree of substitution (DS), i.e. the average number of OH-groups per sugar molecule substituted, may be from 0.1 to 0.2.

In certain embodiments the amount of hydroxypropyl groups in carboxymethyl hydroxypropyl guar expressed as molar substitution (MS), i.e. the average number of propylene oxide groups per sugar molecule, may be from 0.2 to 0.3.

The amount polysaccharides and/or polysaccharide derivatives (B) may be from 0.1% to 3% by weight, relating to the base fluid. Preferably, the amount is from 0.2 to 1.5% by weight and more preferably from 0.4 to 1.2% by weight.

Crosslinkers (C)

The aqueous fracturing fluid furthermore comprises at least one crosslinker for the polysaccharides and/or polysaccharide derivatives (B). By crosslinking, the thickening effect of the polysaccharides and/or polysaccharide derivatives may be enhanced.

According to the invention, the crosslinker comprises at least one water-soluble, layered silicate (C1). Of course, a mixture of two or more different water-soluble, layered silicates may be used. Optionally, the aqueous fracturing fluid may comprise—besides the crosslinkers (C1)—crosslinkers (C2).

The amount of all crosslinkers (C) depends on the amount of the polymer used. In one embodiment the weight ratio polymer/crosslinker (C) is from 5:1 to 300:1, preferably from 10:1 to 100:1, more preferably from 20:1 to 50:1, and for example from 25:1 to 35:1.

Water-Soluble, Layered Silicates (C1)

The aqueous fracturing fluid comprises at least one water-soluble, layered silicate (C1) as crosslinker.

It is important to note that layered silicates may contain water-insoluble portions, such as impurities besides water-soluble portions. Although we do not wish to be bound by theory, solutions of layered silicates may be typically described as dispersions of small silicate particles in water (e.g. of silicate particles having a particle size of less than 50 nm). Typically, the particle size may influence the solubility. A layered silicate comprising large particles may be not water-soluble but may become water-soluble when the particle size decreases.

Within the context of the present invention, the term "water-soluble" shall mean that the layered silicate used does not comprise more than 30% by weight, of water-insoluble components and that the water solubility of the water-soluble portion is at least 5% by weight, both parameters determined at 20° C. in desalinated water having a pH of 7. The amount of water-insoluble compounds may be measured in usual manner by centrifugation of the aqueous solution and determining the amount of sedimented material. The water solubility may be determined by trying to dissolve the material at different concentrations.

Preferably, the amount of water-insoluble material should be not more than 20% by weight, more preferably not more than 15% by weight.

Preferably, the solubility of the water-soluble portion should be at least 10% by weight and more preferably at least more than 20% by weight.

Water-soluble, layered silicates for use in the present invention may be of synthetic or natural origin and may be crystalline, partially crystalline or amorphous. Layered silicates are alternatively referred to as phyllosilicates and consist of silicate anions where the layers are formed by corner connected $SiO_4$-tetrahedra. Such layers or double layers are not connected via Si—O— bonds. Layered silicates may intercalate water and cations.

Layered silicates consist of a family of materials which have been described comprehensively classified by Liebau (Structural Chemistry of Silicates: Structure, Bonding, and Classification, 1985, Springer Science & Business Media).

Examples of suitable layered silicates which may be used for the present invention include:

(a) Layered silicates with layers of single tetrahedra with 4-, 5-, (6-), and 8-membered rings. Examples comprise the following minerals or groups of minerals: Gillespite, ekanite, apophyllite, magadiite, dalyite, sazhinite, armstrongite, okenite, nekoite, cavansite, pentagonite, penkvilksite, nabesite, ajoite, zerayshanite, bussyite, and plumbophyllite.

(b) Layered silicates with double layers with 4- and 6-membered rings. Examples comprise the following minerals or groups of minerals: Rhodesite, delhayelite, monteregianite, and carletonite.

(c) Layered silicates with glimmer layers with tetrahedral or octahedral-layers. Examples comprise the following minerals or groups of minerals: Talc, pyrophyllite, muskovite, phlogopite, illite, margarite, clintonite, montmorillonite, saponite, vermiculite, chlorite, corrensite, macaulayite, burckhardtite, surite, and kegelite.

(d) Layered silicates with kaolinite layers (double layers) with tetrahedral or octahedral-layers. Examples comprise the following minerals or groups of minerals: kaolinite, halloysite, serpentine, and bismutoferrite.

(e) Simple nets of tetrahedra consisting of sixfold rings connected via octahedral nets or bands. Examples comprise the following minerals or groups of minerals: Bementite, schallerite, palygorskite, sepiolite, gyrolite, reyerite, natrosilite, makatite, varennesite, raite-group, intersilite, shafranovskite, zeophyllite, minehillite, and lalondeite.

(f) Simple nets of six-fold rings connected over tetrahedral or octahedral. Examples comprise the following minerals or groups of minerals: Petalite, sanbornite, searlesite, silinaite, kanemite, and yakovenchukite.

(g) Double nets of sixfold or larger rings. Examples comprise the following minerals or groups of minerals: Cymrite, naujakasite, dmisteinbergite, kampfite, straelingite, ganophyllite, zussmanite, stilpnomelane, latiumite, jagoite, wickenburgite, hyttsjölte, armbrusterite, britvinite, and bannisterite.

(h) Transitional structures between layered silicates and other silicates. Examples comprise the following minerals or groups of minerals: Neptunite, grumantite, ussingite, leifite, and nafertisite.

(i) Layered silicates not being part to one of the aforementioned groups like the following examples of the following minerals or groups of minerals: Lourenswalsite and middendorfite.

The water solubility of the layered silicates as defined above may depend on the particle size of the layered silicates used. So, a specific layered silicate may not be water soluble as defined above when it is present as larger particles and it may be water-soluble as defined above when it is present as small particles. The particle size defining the borderline between being water-soluble and not being water-soluble may be different for different materials. However roughly spoken, an average particle size of less than 50 nm, preferably less than 20 nm may be necessary to ensure water solubility.

In a preferred embodiment of the invention the water-soluble, layered silicates are layered silicates having the general formula I $$NaMSi_xO_{2x+1}*yH_2O \qquad (I).$$

In formula (I) M is an ion selected from the group of alkali metal ions and/or a proton, x is a number from 1.9 to 22, preferably 1.9 to 4, and y is a number from 0 to 30. Of course, mixtures of two or more layered silicates of formula (I) may be used. M may be $Li^+$, $Na^+$, $K^+$, $Rb^+$, $Cs^+$, or $H^+$. Preferably, M is selected from $Na^+$ and $H^+$. In one embodiment of the invention M is $Na^+$.

Such layered silicates are well known in the art. Their manufacture is described—by the way of example—in EP 164 514 A1 and the literature cited therein (see in particular page 16), and in WO 91/08171 A1. They are used is large amounts as component of detergents and dish cleaning compositions and they are commercially available, for instance under the trademark SKS®. See for instance F.-J. Dany, W Gohla, J. Kandler, H. P. Rieck, G. Schimmel, "Kristallines Schichtsilikat—ein neuer Builder" in Seifen-Öle-Fette-Wachse 116 (20), 1990, page 805 to page 808.

Examples of such layered silicates comprise $Na_2Si_{22}O_{45}*yH_2O$, $Na_2Si_{14}O_{29}*yH_2O$, $Na_2Si_8O_{17}*yH_2O$, $Na_2Si_4O_9*yH_2O$, $Na_2Si_2O_5$, $NaHSi_2O_5.3H_2O$ or $NaHSi_2O_5$ In one preferred embodiment of the invention x is 2.

More preferably, the formula is $Na_2Si_2O_5$. $Na_2Si_2O_5$ exists in different modifications. Examples comprise amorphous $Na_2Si_2O_5$, $\alpha\text{-}Na_2Si_2O_5$, $\beta\text{-}Na_2Si_2O_5$, $\gamma\text{-}Na_2Si_2O_5$ and $\delta\text{-}Na_2Si_2O_5$. In one embodiment the layered silicate is $\delta\text{-}Na_2Si_2O_5$. $\delta\text{-}Na_2Si_2O_5$ is commercially available for instance under the trademark SKS®-6. Technical $Na_2Si_2O_5$ may comprise—depending on the manufacturing process— certain amounts of other silicates which may be water-insoluble, different crystalline forms of $Na_2Si_2O_5$, or also remaining raw products such as sodium carbonates. Technical $\delta\text{-}Na_2Si_2O_5$ typically comprises additionally minor amounts of other crystalline forms, in particular $\alpha\text{-}Na_2Si_2O_5$, $\beta\text{-}Na_2Si_2O_5$.

In one embodiment of the invention amorphous $Na_2Si_2O_5$ may be used. In another embodiment $\delta\text{-}Na_2Si_2O_5$ may be used.

Other Crosslinkers (C2)

Besides the crosslinker (C1) the aqueous fracturing fluid may comprise optionally also further crosslinkers (C2) differently from the crosslinkers (C1).

Examples of such additional crosslinkers comprise inorganic crosslinkers, in particular metal ions and/or metallate ions such as aluminium ions, titanate ions, or zirconate ions.

The amount of crosslinkers (C2) may be chosen by the skilled artisan according to his/her needs. Generally, the amount of crosslinkers (C2) should not exceed 50% by wt. relating to the total amount of all crosslinkers (C) used. Preferably, the amount of crosslinker (C2) is less than 20% by weight and most preferably only crosslinkers (C1) are used.

Proppants (D)

The aqueous fracturing fluid furthermore comprises at least one proppant which is suspended in the aqueous fracturing fluid. Proppants are small hard particles which cause that fractures formed in course of the process do not close after removing the pressure. In certain embodiments the particle size of the proppants may be from 0.1 to 2 mm, for example 0.2 mm to 1 mm.

Examples of proppants include naturally-occurring sand grains, resin-coated sand, sintered bauxite, ceramic materials, glass materials, polymer materials, ultra lightweight polymer beads polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combinations thereof.

The amount of proppants in the aqueous fracturing fluid may be from 50 kg/m³ to 3500 m³/kg of the fracturing fluid, preferably from 50 kg/m³ to 1200 kg/m³ of the fracturing fluid.

Breakers (E)

After creating new fractures and/or extending existing fractures in the formation it is important to remove the crosslinked, viscous fracturing fluid (except the proppants) from the formation in order to avoid that the formation remains completely or partly plugged and the flow of crude oil and/or gas from the formation to the wellbore is impeded.

In one embodiment the aqueous fracturing fluid therefore comprises additionally at least one breaker (E). Breakers reduce the viscosity of the crosslinked fracturing fluid by breaking polymer chains thereby improving the removal of the fluid from the subterranean formation.

Examples of breakers comprise oxidizing agents and enzymes capable of cleaving bonds in the polymer chain.

In one embodiment of the invention the breaker is at least one enzyme. The enzyme can be any enzyme capable of degrading polysaccharides and/or polysaccharide derivatives. Non-limiting examples of the enzyme include cellulases, hemicellulases, pectinases, xanthanases, mannanases, galactosidases, glucanases, amylases, amyloglucosidases, invertases, maltases, endoglucanase, cellobiohydrolase, glucosidase, xylanase, xylosidase, arabinofuranosidase, oligomerase, and the like, and any mixtures thereof. The galactosidases can be α-galactosidases, β-galactosidases, or any combination thereof. The glucosidases can be α-glucosidases, β-glucosidases, or any combination thereof. The amylases can be α-amylases, β-amylases, γ-amylases, or any combination thereof. In some embodiments, the enzyme is a thermostable or thermotolerant enzyme.

In a preferred embodiment the enzyme is a cellulase.

In some embodiments, the enzyme is any of the cellulases derived from hyperthermophilic bacteria and/or non-naturally occurring variants thereof described in WO 2009/020459 A2. In some embodiments, the enzyme is encoded by a nucleic acid sequence having at least 70%, 80%, 90%, 95%, 96%, 97%, 98%, 99%, 100%, or a range defined by any two of these values, sequence identity to any of the below-listed DNA sequences described in WO 2009/020459 A2. In some embodiments, the enzyme has an amino acid sequence having at least 70%, 80%, 90%, 95%, 96%, 97%, 98%, 99%, 100%, or a range defined by any two of these values, sequence identity to any of the below-listed protein sequences described in WO 2009/020459 A2. The DNA and protein sequences include: WO 2009/020459 A2 SEQ ID NOS: 1, 2, 3, 6, 7, 8, 9, 10, 11, 12, 13, 14, 15, 16, 17, 18, 19, 20, 21, 22, and 23.

Besides the above-listed nucleotide and amino acid sequences related to wild-type and evolved variants of the cellulase from *Thermotoga maritima* strain MSB8, the additional mutants listed in Table 2 and Example 5 (from WO 2009/020459 A2) are also deemed useful as components of the compositions described herein and/or in the methods of making these compositions.

In one preferred embodiments, the enzyme can be a cellulase or a variant of a cellulase disclosed in U.S. Pat. Nos. 5,962,258, 6,008,032, 6,245,547, 7,807,433, WO 2009/020459 A2, WO 2013/148163 A1. In some embodiments, the cellulase can be a commercially available product including, but not limited to, PYROLASE® 160 cellulase, PYROLASE® 200 cellulase, or PYROLASE® HT cellulase (BASF Enzymes LLC, San Diego, Calif.), or any mixture thereof. In some embodiments, the cellulase is PYROLASE® HT cellulase.

In one embodiment, the breaker is an encapsulated breaker.

By encapsulation the effect of the breaker on the polysaccharides and/or polysaccharide derivatives may be delayed, thereby avoiding too early depolymerization. Furthermore, sensitive breakers, such as for instance enzymes may be protected by encapsulation. Examples of encapsulated breakers are for instance disclosed in WO 2010/140033 A2 or WO 2015/039032 A1.

In a preferred embodiment, the breaker is an encapsulated enzyme.

In one embodiment, the encapsulated breaker is a particle comprising an enzyme-containing core and a shell which fully or partly encapsulates the enzyme-containing core. Preferably, the core should be fully encapsulated by the shell.

The shell preferably comprises a polymer. Examples of polymers comprise ethylcellulose, acrylic resin, plastics, methacrylate, acrylate, acrylic acetate, polyvinylidene chloride (PVDC), nitrocellulose, polyurethane, wax, polyethylene, polyethylene glycol, polyvinylalcohol, polyester, polylactic acid, polyglycolic acid, copolymers of polylactic and polyglycolic acids, polyvinyl acetate, vinyl acetate acrylic copolymer, alginates, agar, styrene-acrylate copolymer, styrene/n-butyl acrylic copolymer, or any combination thereof. In one embodiment, the shell comprises an acrylic polymer.

The core comprises at least one enzyme. Examples of enzymes and of preferred enzymes have already been disclosed above. Preferably, the enzyme is a cellulase.

In addition to the enzyme, the enzyme-containing core may include one or more additional components. Non-limiting examples of the additional component include stabilizers, buffers, acidifiers and anti-microbial agents.

In some embodiments, the enzyme-containing core comprises one or more buffering agents. As used herein, the terms "buffer" and "buffering agent" are used interchangeably, and refer to any substance that can control the pH of the environment in which it is present. Examples of buffers include, but are not limited to, sodium or potassium salt of citrate, sodium or potassium salt of phosphate (monobasic and/or dibasic), succinic acid and its salt, Tris-HCl buffers, morpholinoethanesulphonic acid (MES) buffers, pyridine, cacodylate buffers, Bis(2-hydroxyethyl)aminotris(hydroxymethyl)methane (BIS-TRIS buffers, piperazine-N,N'-bis(2-ethanesulfonic acid (PIPES) buffers, 3-(N-morpholino)propanesulfonic acid (MOPS) buffers, 3-(N-Morpholino)-2-hydroxypropanesulfonic acid (MOPSO) buffers.

In some embodiments, the enzyme-containing core material comprises one or more acidifying agents. As used herein, the terms "acidifying agent" and "acidifier" are used interchangeably, and refer to any substance that can lower the pH of the environment in which it is present. For example, the acidifying agent can be an organic acid, or a salt or ester thereof, or an inorganic acid, or a salt or ester thereof.

In some embodiments, the acidifying agent comprises mild acidifying inorganic salts, organic acids, salts of organic acids, (poly)esters of organic acids, organic buffers, or any combination thereof. Examples of organic buffers include, but are not limited to, Tris-HCl buffers, morpholinoethanesulphonic acid (MES) buffers, pyridine, cacodylate buffers, Bis(2-hydroxyethyl)-amino-tris(hydroxymethyl)methane (BIS-TRIS buffers, piperazine-N,N'-bis(2-ethanesulfonic acid (PIPES) buffers, 3-(N-morpholino)propanesulfonic acid (MOPS) buffers, 3-(N-Morpholino)-2-hydroxypropanesulfonic acid (MOPSO) buffers, ethylenediamine-tetraacetic acid (EDTA) buffers, glycine buffers, and any combination thereof. Examples of mild acidifying inorganic salts include, but are not limited to, ammonium sulfate, sodium phosphate monobasic, ammonium chloride, sodium sulfate, potassium phosphate monobasic, magnesium chloride, sodium phosphate dibasic, potassium phosphate dibasic, and any combination thereof. Non-limiting examples of (poly)esters of organic acid include polylactic acid, poly(lactic-co-glycolic acid), polyglycolic acid, poly (ethylene) therephtalates, polycaprolactone, diphenyl oxalate, and any combination thereof. In some embodiments, the organic acid is citric acid, oxalic acid, malonic acid, glycolic acid, pyruvic acid, lactic acid, maleic acid, aspartic acid, isocitric acid, any salt of these organic acids, or any combination thereof. In some embodiments, the acidifying agent comprises or is an ester, a lactone, polyester, polylactone, or any combination thereof. In some embodiments, the acidifying agent comprises or is an ester. Non-limiting examples of polyester include solid biodegradable polyesters (SBPs), such as polybutylene succinate (PBS), poly(bu-tylene succinate-co-butylene terephthalate (PBBT), polybutylene terephalate, polyhydroxybuty-rate, and any combination thereof.

The amount of acidifying agent in the enzyme-containing core can vary. For example, the amount of the acidifying agent in the enzyme-containing core can be, 0%, 0.1%, 0.2%, 0.5%, 1%, 2%, 5%, 10%, 15%, 20%, 25%, 30%, 35%, 40%, 45%, and up to 50%, of weight, based on the total weight of the microcapsule.

In one embodiment, the core comprises at least one enzyme and at least one acidifier.

Examples of suitable encapsulated enzymes are disclosed in WO 2015/039032 A1 and in U.S. 62/154,756.

Flowback Aids (F)

In a further embodiment the aqueous fracturing fluid comprises at least one flowback aid (F).

Flowback aids are usually surface active components or co-solvents added to fracturing fluids to reduce capillary pressure, thereby facilitating the removal of injected fracturing fluid from the subterranean formation.

Examples of flowback aids comprise alkyl or alkenyl polyglucosides, carboxylated alkyl or alkenyl polyglucosides, alkoxylated branched alcohols or esters of an alkoxylated saccharide. Such flowback aids are described in WO 2014/108350 A1.

In a preferred embodiment, the flowback aids (F) are alkyl or alkenyl polyglucosides having the formula $R^1O[G]_p$, wherein $R^1$ is an alkyl or alkenyl radical having from 10 to 22 carbon atoms, G is a sugar unit having 5 or 6 carbon atoms, preferably glucose, and p is a number from 1 to 10, preferably from 1.1 to 3.0.

If present at all, the amount of flowback aids (F) may be from 0.01% to 1% by weight relating to the aqueous base fluid, and more preferably from 0.02% to 0.5% by weight.

Further Components

Besides the components (A) to (D) and optionally (E) and/or (F) mentioned above, the aqueous fracturing fluid may optionally comprise further components.

Examples of such further components comprise bases, biocides, buffers, clay stabilizers, corrosion inhibitors, fibers, defoamers, non-emulsifying agents, scale inhibitors, oxygen scavengers, thickening polymers different from the polysaccharide and/or polysaccharide derivatives (B), friction reducers, or surfactants.

In one embodiment of the invention, the aqueous fracturing fluid comprises fibers. Fibers may be used for creating a fiber-based network thereby providing a mechanicals means to suspend and transport the proppants in the aqueous fracturing fluid. Suitable fibers for aqueous fracturing fluids are commercially available.

Preparation of the Aqueous Fracturing Fluid

In general, the components of the fracturing fluid are mixed at the surface using conventional equipment and techniques. The aqueous fracturing fluid may be prepared by mixing all components of the fluid.

The pH-value of the aqueous fracturing fluid may be chosen by the skilled artisan according to his/her needs. It may be from 3 to 14. Preferably, the pH is from 5 to 12, more preferably from 8 to 12 and for example from 9.5 to 11.5.

In one embodiment the polysaccharides and/or polysaccharide derivatives (B) are added to the aqueous base fluid (A), thereafter the pH value adjusted to the desired value using—as the case may be—acids or bases and the polysaccharides and/or polysaccharide derivatives (B) are dissolved, preferably while stirring vigorously. After dissolution of the polysaccharides and/or polysaccharide derivatives (B), the crosslinker (C) is added and then the proppant (D) is added. The pH-value may be adjusted before or after adding such additives. Also, further components such as breakers, surfactants, or friction reducers may be added after dissolving the polymer.

Guar gums may be provided as dispersion in mineral oil. So, in another embodiment of the invention a dispersion of guar gum in mineral oil is mixed with the aqueous base fluid and the mixture acidified to a pH of about 4.5. After dissolution of the guar gum, base is added and the pH value set to about 10 to 11. Of course, guar gums may also be dispersed directly in water.

Preparing the aqueous fracturing fluid may preferably performed on the oilfield.

In an alternative embodiment, a solution of polysaccharides and/or polysaccharide derivatives (B) mixed with proppants (D) and a crosslinker solution may be injected separately into the formation.

Aqueous Fracturing Fluid

The specific composition of the aqueous fracturing fluid is selected by the skilled artisan according to his/her needs.

In one embodiment the aqueous fracturing fluid comprises at least (A) an aqueous base fluid, preferably water,
(B) 0.1 to 2.0% by wt., preferably 0.2 to 1.5% by wt. and more preferably from 0.4 to 1.2% by wt., relating to the aqueous base fluid (A), of guar gum and/or a guar gum derivative, preferably carboxymethyl hydroxypropyl guar,
(C) a water-soluble, layered silicate having the general formula $NaMSi_xO_{2x+1}*yH_2O$, wherein M is an ion selected from the group of alkali metal ions and/or a proton, preferably $Na^+$ or a proton, x is a number from 1.9 to 22 and y is a number from 0 to 30, wherein M, x, and y have the meaning as described above and the weight ratio polymer/crosslinker is from 5:1 to 300:1, preferably from 10:1 to 100:1, more preferably from 20:1 to 50:1, and for example from 25:1 to 35:1, and
(D) a proppant.

Preferred water-soluble, layered silicates having the general formula $NaMSi_xO_{2x+1}*yH_2O$ have already been mentioned above.

In another embodiment the aqueous fracturing fluid comprises (A) an aqueous base fluid, preferably water,
(B) 0.1 to 2.0% by wt., preferably 0.2 to 1.5% by wt. and more preferably from 0.4 to 1.2% by wt., relating to the aqueous base fluid (A), of guar gum and/or a guar gum derivative, preferably carboxymethyl hydroxypropyl guar,
(C) a water-soluble, layered silicate having the general formula $NaMSi_xO_{2x+1}*yH_2O$, wherein M is an ion selected from the group of alkali metal ions and a proton, preferably $Na^+$ or a proton, x is a number from 1.9 to 22 and y is a number from 0 to 30, wherein M, x, and y have the meaning as described above and the weight ratio polymer/crosslinker is from 5:1 to 300:1, preferably from 10:1 to 100:1, more preferably from 20:1 to 50:1, and for example from 25:1 to 35:1, and
(D) a proppant, and
(E) at least one breaker, preferably an enzyme, more preferably an encapsulated enzyme, more preferably an encapsulated cellulase.

Preferred water-soluble, layered silicates having the general formula $NaMSi_xO_{2x+1}*yH_2O$ have already been mentioned above.

Method of Fracturing

The method of fracturing a subterranean formation according to the present invention may be applied to any subterranean formation, preferably hydrocarbon containing subterranean formations. The hydrocarbons may be oil and/or gas. Besides oil and/or gas the formations may contain water which usually comprises salts. The salinity of the formation water may be at least 100 ppm. Examples of salinity ranges comprise 1,000 to 230,000 ppm, 10,000 ppm to 230,000 ppm or 20,000 ppm to 150,000 ppm.

The formations may be sandstone, carbonate or shale formations. The formation temperature usually is above room temperature and may be at least 35° C., preferably at least 40° C., more preferably at least 50° C. The formation temperature may be up to 180° C. For example, the formation temperature may be from 40° C. to 180° C., preferably from 40° C. to 120° C., and more preferably from 50° C. to 90° C.

For applying the method according to the present invention to the formation, the formation is penetrated by at least one wellbore. The wellbore may be a "fresh" wellbore drilled into the formation which needs to become prepared for oil and/or gas production. In another embodiment the wellbore may be a production well which already has been used for producing oil and/or gas but the production rate decreased and it is necessary to fracture the formation (again) in order to increase production.

In the method of fracturing a subterranean formation according to the present invention the aqueous fracturing fluid is injected into at least one wellbore at a rate and pressure sufficient to flow into the formation and to initiate or extend a fracture in the formation. In order to initiate or to extend fractures in the formation a bottomhole pressure sufficient to open a fracture in the formation is necessary. The bottomhole pressure is determined by the surface pressure produced by the surface pumping equipment and the hydrostatic pressure of the fluid column in the wellbore, less any pressure loss caused by friction. The minimum bottomhole pressure required to initiate and/or to extend fractures is determined by formation properties and therefore will vary from application to application. Methods and equipment for fracturing procedures are known to the skilled artisan. The aqueous fracturing fluid simultaneously transports suspended proppants and the proppant becomes deposited into the fractures and holds fractures open after the pressure exerted on the fracturing fluid has been released.

The crosslinker (C) used according to the present invention, i.e. the crystalline, layered silicate having the formula mentioned above is capable of crosslinking the polysaccharides and/or polysaccharide derivatives (B) thereby increasing the viscosity of the aqueous fracturing fluid. At high degrees of crosslinking a highly viscous polymer gel may be formed. An increased viscosity aids in properly distributing the proppant (D) in the fluid. In fluids having a low viscosity, the proppants may sediment. The rate of crosslinking increases with increasing temperatures.

When flowing through the wellbore and penetrating into the subterranean formation the aqueous fracturing fluid warms up depending upon the formation temperature thereby increasing the rate of crosslinking. So, crosslinking mainly happens after the aqueous fracturing fluid has been injected into the wellbore. While handling at the surface, the aqueous fracturing fluid has a relatively low viscosity while the fluid in the formation has a higher viscosity.

In one embodiment, the temperature of the aqueous fracturing fluid before injection into the formation is less than 35° C., preferably less than 30° C., more preferably 15° C. to 25° C. and the formation temperature is at least 35° C., for instance from 40° C. to 180° C., preferably 40° C. to 120° C., and more preferably from 50° C. to 90° C.

After creating new fractures or extending existing fractures in the formation, the applied pressure is reduced thereby allowing the fractures to close. Proppant (D) "props" fractures open and fracturing fluid is shut in or allowed to flow back. Furthermore, at least a part of the fluid injected may flows back to the wellbore. The aqueous fracturing fluid flown back from the formation into the wellbore is removed from the wellbore.

It goes without saying for the skilled artisan that the fluid recovered may no longer have exactly the same composition than the injected fracturing fluid: Proppants (D) injected remain in the formation and the injected fluid may be mixed with formation fluids such as oil and/or formation water. The total amount of fluid recovered usually depends on the formation, for instance on how much water the formation adbsorbs and absorbs into its structure. Additionally, fluid may be lost to the formation.

In order to avoid plugging the formation by fracturing fluid the fracturing fluid injected may comprise breakers (E) and/or flowback aids (F) which both promote the removal of fracturing fluid from the formation. Breakers cleave the chains of polysaccharides and/or polysaccharide derivatives (B) thereby decreasing the viscosity and flowback aids (F) support the flow of the fracturing fluid in the formation.

The examples which follow are intended to illustrate the invention in detail:

Materials Used:

Polymers

| | |
|---|---|
| Carboxymethyl hydroxylpropyl guar (CMHPG) | Commercially available carboxymethyl hydroxypropyl guar (Galactasol ® 638, Ashland) Amount of carboxymethyl groups: Degree of substitution (DS, i.e average number of OH-groups per sugar molecule substituted) ~0.12 Amount of hydroxypropyl groups: Molar substitution (MS, i.e. average number of propylene oxide groups per sugar molecule) ~0.24 Viscosity in aqueous KCl (2% by wt.) solution at 511 s$^{-1}$ after 60 min: 39 to 41 mPa*s, pH (1% by wt. solution in water) 9.5 to 10.5 |
| Guar Gum (GG) | Commercially available Guar Gum (Galactasol ® 274, Ashland) |
| Carboxymethyl-celloluse (CMC) | Commercially available carboxymethyl cellulose |

Crosslinkers

| | |
|---|---|
| Water-soluble, layered silicate | Commercially available $Na_2Si_2O_5$ (Waweich$^{JP}$), amorphous, comprising same remaining $Na_2CO_3$, results of X-ray fluorescence analysis: Si 14.7% by wt., Na 25.2% by wt., and C 4.8% by wt. |
| Water glass | Commercially available sodium silicate solution, molar ratio $SiO_2/Na_2O$ 3.8, density (20° C.) 1.32 g/cm$^3$, solids contents ~33% by wt., (Na-Silikat HK 35 of Woellner, Ludwigshafen, Germany) |
| Layered double hydroxide | $Mg_6Al_2(OH)_{18}$•4.5 $H_2O$ |
| Zirconate | $ZrOCl_2$•$8H_2O$ |
| Borax | $Na_2[B_4O_5(OH)_4]$•$8H_2O$ |
| Kaolinite | $Al_4[(OH)_8Si_4O_{10}]$ |

Other Ingredients:

| | |
|---|---|
| Biocide | aqueous solution of 2.5 wt. % of 1,2-Benzisothiazolin-3-one and 2.5 wt. % of 2-Methyl-4-isothiazolin-3-one (Acticide ® MBS of Thor GmbH, Speyer, Germany) |

A Determination of Solubilities and Amount of Insoluble Portions of Layered Silicates In the tests two different silicates were tested. The layered silicate $Na_2Si_2O_5$ has also been used as crosslinker according to the present invention. The kaolinite $Al_4[(OH)_8Si_4O_{10}]$ has been tested for comparative purposes.

In a first step the solubility ranges for the two silicates were tested. All tests were performed at room temperature. The silicates to be tested were mixed with desalinated water having a pH of 7 in a vial. The vials were closed and rolled at room temperature on rollers for 2 h. The amounts of silicates and water used are listed in the following table S-1 (for $Na_2Si_2O_5$) and S-2 (for $Al_4[(OH)_8Si_4O_{10}]$). The amount of dissolved material was determined visually.

TABLE S-1

Solubility tests with the layered silicate $Na_2Si_2O_5$•

| Amounts used for test [g] | | Amount of solids | |
|---|---|---|---|
| $Na_2Si_2O_5$• | Water | [% by wt.] | Observation |
| 2.009 | 2.010 | 50.0 | Not dissolved, pasty-like |
| 1.008 | 4.030 | 20.0 | Mostly dissolved, small amount of insoluble particles |
| 0.503 | 4.689 | 9.7 | Mostly dissolved, small amount of insoluble particles |
| 0.251 | 4.765 | 5.0 | Mostly dissolved, small amount of insoluble particles |
| 0.100 | 10.073 | 1.0 | Mostly dissolved, small amount of insoluble particles |
| 0.050 | 9.905 | 0.5 | Mostly dissolved, small amount of insoluble particles |

TABLE S-2

Solubility tests with $Al_4[(OH)_8Si_4O_{10}]$•

| Amounts used for test [g] | | Amount of solids | |
|---|---|---|---|
| $Al_4[(OH)_8Si_4O_{10}]$ | Water | [% by wt.] | Observation |
| 2.009 | 2.010 | 50.0 | Not dissolved, pasty-like |
| 1.008 | 4.030 | 20.0 | Not dissolved |
| 0.503 | 4.689 | 9.7 | Not dissolved |
| 0.251 | 4.765 | 5.0 | Not dissolved |
| 0.100 | 10.073 | 1.0 | Not dissolved |
| 0.050 | 9.905 | 0.5 | Not dissolved |

The tests show that the kaolinite sample used was not soluble or nearly insoluble at all concentrations tested. The silicate sample $Na_2Si_2O_5$ tested was soluble (with some amount of insoluble material remaining) up to at least 20% by wt. It was no longer soluble at a concentration of 50% by wt.

Further tests were performed at lower concentrations in the same manner by mixing the silicates and water in vials. The vials were rolled overnight at room temperature. Thereafter the vials were centrifuged at 3000 rpm for 15 min. The mixture separated into a clear supernatant solution and a precipitate at the bottom of the vial. The supernatant solution was withdrawn with a syringe and the amount of solids dissolved therein analyzed. The proportion of solids dissolved compared to the initial amount used was calculated. The results with the silicate $Na_2Si_2O_5$ are represented in table S-3, the results with kaolinite are represented in table S-4.

S-3: Determination of insoluble amounts in $Na_2Si_2O_5$

| Amounts used for test [g] | | Amount of solids [% by wt.] | | Amount of solids dissolved |
|---|---|---|---|---|
| $Na_2Si_2O_5$ | Water | Original mixture | in supernatant solution | |
| 5.01 | 20.06 | 20.0 | 17.17 | 85.9% |
| 2.54 | 22.98 | 9.9 | 8.55 | 85.5% |
| 1.26 | 24.09 | 5.0 | 4.31 | 86.2% |
| 0.25 | 25.19 | 1.0 | 0.87 | 87.0% |
| 0.13 | 25.11 | 0.5 | 0.43 | 86.0% |

S-4: Determination of insoluble amounts in $Al_4[(OH)_8Si_4O_{10}]$

| Amounts used for test [g] | | Amount of solids [% by wt.] | | Amount of solids dissolved |
|---|---|---|---|---|
| $Al_4[(OH)_8Si_4O_{10}]$ | Water | Original mixture | in supernatant solution | |
| 1.33 | 25.37 | 5.0 | 0.012 | 0.2% |
| 0.13 | 26.20 | 0.5 | 0 | 0% |

The dissolved amount of the silicate $Na_2Si_2O_5$ is independently of the concentration in the range from 85.5 to 87% by wt. So, the sample comprises about 13 to 14.5% by wt. of water-insoluble amounts but is—besides this amount—water-soluble up to at least 20% by wt. So, said layered silicate sample is suitable as crosslinkers for fracturing fluids.

The kaolinite sample is not soluble even at small concentrations. It is not suitable as crosslinker for fracturing fluids.

B Test of Fracturing Fluids

Preparation of the Test Fluids:

Method A—Only One Crosslinker 98.842 g tap water and 0.104 ml of the abovementioned biocide were filled into a 250 ml three-necked flask and stirred at 300 rpm with a Teflon-blade stirrer. The pH was set to 5.5 using either hydrochloric acid solution (15% by wt.) or NaOH solution (2% by wt.), depending on the pH of the tap water.

The polymer to be evaluated was added portionwise to the tap water while stirring at 300 rpm. After adding the complete amount of polymer the solution was stirred for another 10 minutes. The amount of polymer used is listed in tables 1 to 8 respectively. Thereafter the desired pH value was set using either NaOH solution (2% by wt.) or hydrochloric acid solution (15% by wt.) while stirring at 500 rpm.

Thereafter, the desired amount of crosslinker was added as aqueous solution (the type of crosslinker and the amounts are mentioned in tables 1 to 8). In case of $Na_2Si_2O_5$ as crosslinker, an aqueous solution having a concentration of 1.158 wt % was used. For other experiments solutions having 11.58% or 0.1158% were used.

The revolution speed of the stirrer was adjusted to 250-1100 rpm. Best results were obtained applying 250 rpm. Thereafter the mixture was heated. Once the desired temperature, usually 40-60° C. was reached, the sample was dwelled for 20 minutes and cooled to ambient conditions afterwards. Cooling was achieved by removing the heat source. The second heating cycle was done exactly as the first one and once again the sample was cooled down to ambient conditions. The stirring was maintained throughout both heating and cooling cycles.

Method B—Mixture Crosslinker with Zr-Compound as Additional Crosslinker 99.0 g of tap water and 0.104 ml of the above mentioned fungicide "Acticide MBS" were put into a 250 ml three-necked flask and stirred at 300 rpm with an overhead stirred with teflonblade strirrer. The pH was set to 5.5 using either hydrochloric acid solution (w=15%) or caustic soda solution (w=2%). The guar gum was added in portions while stirring at 300 rpm and stirred for 10 minutes. Zirconyl chloride octahydrate ($ZrOC_2*8H_2O$) is added as solid to the solution and dissolved under stirring. Target pH (e.g. 11) set using caustic soda solution (w=2%) and stirred at 500 rpm. The solution should be processed directly. Thereafter, the desired amount of the chosen crosslinker was added as aqueous solution (the type of crosslinker and the amounts are mentioned in tables 1 to 8).

The revolution speed of the stirrer was set to the desired conditions of 250-1100 rpm. Best results were obtained applying 250 rpm. and The heating process begins. Once the desired temperature, usually 40-60° C. was reached, the sample was dwelled for 20 minutes and cooled to ambient conditions afterwards. Cooling was achieved by removing the heat source. The second heating cycle was done exactly as the first one and once again the sample was cooled down to ambient conditions. The stirring was maintained throughout both heating and cooling cycles.

Determination of Viscosities:
Bostwick Measurements

The viscosities of the obtained polymer gels were measured according to the Bostwick principle. The measurements were performed at room temperature.

For the measurements a 1000 ml measuring cylinder was used. The cylinder was mounted at a support at an inclination of about +30° (opening upwards, see FIG. 1). Then 10 ml of the sample to be tested were filled onto the bottom of the measuring cylinder using a syringe. Thereafter, the measuring cylinder was tilted to an inclination of about −3° for samples with low viscosity and −23° for measuring highly viscous samples so that the opening showed slightly downwards (see FIG. 2). The sample began to flow toward the opening. When the front of the sample reached the 500 ml mark time measurement started and it stopped when the front reached the 1000 ml mark. The time difference $t_{1000\ ml} - t_{500\ ml}$ is an indication of the viscosity. The larger the time difference, the higher the viscosity.

The results are summarized in the following tables 1 to 8. The abbreviations for polymers and crosslinkers used in the table have been defined above.

TABLE 1

| | Polymer | | Crosslinker | | proportion | | Bostwick viscosity | | |
|---|---|---|---|---|---|---|---|---|---|
| No. | Type | Amount [g/100 g]* | Type | Amount [g/100 g] | polymer/ crosslinker | Initial pH | Angle | Time [s] | comments |
| C1 | CMHPG | 0.6 | — | — | — | pH 11 | −3° | 22 | without crosslinker |
| C2 | CMHPG | 1.2 | — | — | — | pH 11 | −23° | 160 | without crosslinker |
| 1 | CMHPG | 0.6 | Layered silicate | 0.1 | 6:1 | pH 11 | −3° | 60 | |
| C3 | CMHPG | 0.6 | Borax | 0.02 | 30:1 | pH 11 | −3° | 71 | |
| 2 | CMHPG | 0.6 | Layered Silicate | 0.02 | 30:1 | pH 11 | −3° | 63 | |
| C4 | CMHPG | 0.8 | Borax | 0.0266 | 30:1 | pH 11 | −23° | 35 | |
| 3 | CMHPG | 0.8 | Layered Silicate | 0.0266 | 30:1 | pH 11 | −23° | 27 | |
| C5 | CMHPG | 1.2 | Borax | 0.04 | 30:1 | pH 11 | −23° | 317 | |
| 4 | CMHPG | 1.2 | Layered Silicate | 0.04 | 30:1 | pH 11 | −23° | 390 | |
| C6 | CMHPG | 1.2 | Borax | 0.004 | 300:1 | pH 11 | −23° | 191 | |
| 5 | CMHPG | 1.2 | Layered Silicate | 0.004 | 300:1 | pH 11 | −23° | 186 | |

Results of experiments done according to Method A and comparative experiments (*amount in g per 100 g fluid)
Initial pH: pH measured directly after adjusting the pH
Components as defined in the table above.

TABLE 2

| | Polymer | | Crosslinker 1 | | Crosslinker 2 | | proportion polymer/ crosslinker 1/ crosslinker 2 | | Bostwick viscosity | |
|---|---|---|---|---|---|---|---|---|---|---|
| No. | Type | Amount [g/100 g] | Type | Amount [g/100 g] | Type | Amount [g/100 g] | | pH | Angle | Time [s] |
| C7 | CMHPG | 1.2 | Zirconate | 0.04 | — | — | 30:1 | pH 11 | −23° | 820 |
| C8 | CMHPG | 1.2 | Zirconate | 0.04 | Borax | 0.04 | 30:1:1 | pH 11 | −23° | 1187 |
| 6 | CMHPG | 1.2 | Zirconate | 0.04 | Layered Silicate | 0.04 | 30:1:1 | pH 11 | −23° | >1000 |

Results of experiments done according to Method B and comparative experiments (* amount in g per 100 g fluid)
Components as defined in the table above.

TABLE 3

| No. | Polymer Type | Amount [g/100 g] | Crosslinker 1 Type | Amount [g/100 g] | Crosslinker 2 Type | Amount [g/100 g] | proportion polymer/ crosslinker 1/ crosslinker 2 | pH | Bostwick viscosity Angle | Time [s] |
|---|---|---|---|---|---|---|---|---|---|---|
| C9 | GG | 1.2 | Borax | 0.04 | — | — | 30:1 | pH 11 | −23° | >1000 |
| 7 | GG | 1.2 | Layered silicate | 0.04 | — | — | 30:1 | pH 11 | −23° | 584 |

Results of experiments done according to Method A and comparative experiments (* amount in g per 100 g fluid)
Components as defined in the table above.

TABLE 4

| No. | Polymer Type | Amount [g/100 g] | Crosslinker 1 Type | Amount [g/100 g] | Crosslinker 2 Type | Amount [g/100 g] | proportion polymer/ crosslinker 1/ crosslinker 2 | pH | Bostwick viscosity Angle | Time [s] |
|---|---|---|---|---|---|---|---|---|---|---|
| C10 | GG | 1.0 | Borax | 0.03 | Zirconate | 0.03 | 30:1:1 | pH 11 | −23° | 881 |
| 8 | GG | 1.0 | Layered Silicate | 0.03 | Ziconate | 0.03 | 30:1:1 | pH 11 | −23° | 569 |

Results of experiments done according to Method B and comparative experiments (* amount in g per 100 g fluid)
Components as defined in the table above.

TABLE 5

| No. | Polymer Type | Amount [g/100 g]* | Crosslinker Type | Amount [g/100 g] | proportion polymer/ crosslinker | pH | Bostwick viscosity Angle | Time [s] |
|---|---|---|---|---|---|---|---|---|
| 9 | CMHPG | 1.2 | Layered Silicate | 0.04 | 30:1 | pH 11 | −23° | 390 |
| C11 | CMHPG | 1.2 | Borax | 0.04 | 30:1 | pH 11 | −23° | 317 |
| C12 | CMHPG | 1.2 | Layered double hydroxide | 0.04 | 30:1 | pH 11 | −23° | 230 |
| C13 | CMHPG | 1.2 | water glass | 0.04 | 30:1 | pH 11 | −23° | 180 |

Results of experiments done according to Method A and comparative experiments (*amount in g per 100 g fluid)
Components as defined in the table above.

TABLE 6

| No. | Polymer Type | Amount [g/100 g] | Crosslinker Type | Amount [g/100 g] | proportion polymer/ crosslinker | Initial pH | Bostwick viscosity Angle | Time [s] |
|---|---|---|---|---|---|---|---|---|
| C14 | CMHPG | 1.2 | Borax | 0.04 | 30:1 | 3 | −23° | 156 |
| 10 | CMHPG | 1.2 | Layered Silicate | 0.04 | 30:1 | 3 | −23° | 73 |
| C15 | CMHPG | 1.2 | Borax | 0.04 | 30:1 | 5 | −23° | 210 |
| 11 | CMHPG | 1.2 | Layered Silicate | 0.04 | 30:1 | 5 | −23° | 227 |
| C16 | CMHPG | 1.2 | Borax | 0.04 | 30:1 | 7 | −23° | 485 |
| 12 | CMHPG | 1.2 | Layered Silicate | 0.04 | 30:1 | 7 | −23° | 197 |
| C17 | CMHPG | 1.2 | Borax | 0.04 | 30:1 | 9 | −23° | 465 |
| 13 | CMHPG | 1.2 | Layered Silicate | 0.04 | 30:1 | 9 | −23° | 270 |
| C18 | CMHPG | 1.2 | Borax | 0.04 | 30:1 | 10 | −23° | 359 |
| 14 | CMHPG | 1.2 | Layered Silicate | 0.04 | 30:1 | 10 | −23° | 287 |

TABLE 6-continued

| | Polymer | | Crosslinker | | proportion | | Bostwick viscosity | |
|---|---|---|---|---|---|---|---|---|
| No. | Type | Amount [g/100 g] | Type | Amount [g/100 g] | polymer/ crosslinker | Initial pH | Angle | Time [s] |
| C5 | CMHPG | 1.2 | Borax | 0.04 | 30:1 | 11 | −23° | 317 |
| 4 | CMHPG | 1.2 | Layered Silicate | 0.04 | 30:1 | 11 | −23° | 390 |
| C19 | CMHPG | 1.2 | Borax | 0.04 | 30:1 | 12 | −23° | <3000 |
| 15 | CMHPG | 1.2 | Layered Silicate | 0.04 | 30:1 | 12 | −23° | 324 |

Results of experiments done according to Method A and comparative experiments (* amount in g per 100 g fluid)
Initial pH: pH measured directly after adjusting the pH
Components as defined in the table above

TABLE 7

| | Polymer | | Crosslinker 1 | | Crosslinker 2 | | proportion polymer/ | | Bostwick viscosity | |
|---|---|---|---|---|---|---|---|---|---|---|
| No. | Type | Amount [g/100 g] | Type | Amount [g/100 g] | Type | Amount [g/100 g] | crosslinker 1/ crosslinker 2 | pH | Angle | Time [s] |
| C21 | CMC | 1.2 | Borax | 0.04 | — | — | 30:1 | pH 11 | −23° | <10 |
| 17 | CMC | 1.2 | Layered silicate | 0.04 | — | — | 30:1 | pH 11 | −23° | <10 |

Results of experiments done according to Method A and comparative experiments (* amount in g per 100 g fluid)
Components as defined in the table above.

TABLE 8

| | Polymer | | Crosslinker 1 | | Crosslinker 2 | | proportion polymer/ | | Bostwick viscosity | |
|---|---|---|---|---|---|---|---|---|---|---|
| No. | Type | Amount [g/100 g] | Type | Amount [g/100 g] | Type | Amount [g/100 g] | crosslinker 1/ crosslinker 2 | pH | Angle | Time [s] |
| C22 | CMC | 1.0 | Borax | 0.03 | Zirconate | 0.03 | 30:1:1 | pH 11 | −23° | <10 |
| 18 | CMC | 1.0 | Layered Silicate | 0.03 | Ziconate | 0.03 | 30:1:1 | pH 11 | −23° | <10 |

Results of experiments done according to Method B and comparative experiments (* amount in g per 100 g fluid)
Components as defined in the table above.

Comments on the Tests:

Borax is a good crosslinker, however, there are environmental concerns against the use of borax and it may be expected that at least in some legislations the introduction of substitutes for borax may become necessary.

Table 1 shows results in which only one crosslinker is used for crosslinking carboxymethylhydroxypropylguar. The water-soluble, layered silicates have the same performance as borates.

They are therefore suitable as substitute for borax.

Table 2 shows that water-soluble also work in combination with zirconate crosslinkers.

Tables 3 and 4 show test with unmodified guar gum. The performance of the water-soluble, layered silicates is not as good as with carboxymethylhydroxypropylguar but still significant.

Table 5 shows a comparison with other crosslinkers, including the silicon-containing water glass. The performance of the water-soluble, layered silicates is the best of all.

Table 6 shows the influence of the pH value. Tests were performed at different pH values between 3 and 12.

Tables 7 and 8 show test with another polymer, namely carboxymethylcellulose. The water-soluble, layered silicates and borax show a comparable performance. Carboxymethylcellulose as polymer is not as good as guar gum or carboxymethylhydroxypropylguar.

The invention claimed is:

1. A method of fracturing a subterranean formation penetrated by at least a wellbore, comprising at least injecting an aqueous fracturing fluid comprising
    (A) an aqueous base fluid,
    (B) a polysaccharide and/or polysaccharide derivative,
    (C) a crosslinker, and
    (D) a proppant
    into the wellbore at a rate and pressure sufficient to penetrate into the formation and to initiate or extend fractures in the formation,
    wherein the crosslinker comprises a water-soluble layered silicate (C1) having the general formula $NaMSi_xO_{2x+i}*y\ H_2O$, wherein M is an ion selected from the group consisting of alkali metal ions and a proton, x is a number from 1.9 to 22 and y is a number from 0 to 30.

2. The method according to claim 1, wherein x is 1.9 to 4.

3. The method according to claim 1, wherein x is 2.

4. The method according to claim 1, wherein the water-soluble, layered silicate is $Na_2Si_2O_5$.

5. The method according to any claim 1, wherein the aqueous fracturing fluid comprises a further crosslinker (C2) different from (C1).

6. The method according to claim 5, wherein (C2) is selected from the group consisting of aluminium ions, titanate ions, zirconate ions, and combinations thereof.

7. The method according to claim 1, wherein the polysaccharide and/or polysaccharide derivative (B) is selected from the group consisting of xanthans, scleroglucans, galactomannan gums, cellulose derivatives, and combinations thereof.

8. The method according to claim 1, wherein the polysaccharide and/or polysaccharide derivative (B) is guar and/or a guar derivative.

9. The method according to claim 1, wherein the polysaccharide and/or polysaccharide derivative (B) is carboxymethylhydroxypropyl guar.

10. The method to claim 1, wherein the amount of polysaccharides and/or polysaccharide derivatives (B) is from 0.1% to 3% by weight, relating to the base fluid, and the weight ratio of polymer/crosslinker (C) is from 5:1 to 300:1.

11. The method according to claim 10, wherein the weight ratio of polymer/crosslinker is from 10:1 to 100:1.

12. The method according to claim 1, wherein the pH value of the fluid is from 5 to 12.

13. The method according to claim 1, wherein the pH value of the fluid is from 8 to 12.

14. The method according to claim 1, wherein the formation temperature is at least 35° C.

15. The method according to claim 1, wherein the formation temperature is from 40° C. to 120° C.

16. The method according to claim 1, wherein the temperature of the aqueous fracturing fluid before injection is less than 35° C.

17. The method according to claim 1, wherein the aqueous fracturing fluid comprises additionally at least one breaker (E).

18. The method according to claim 17, wherein the breaker is an enzyme.

19. The method according to claim 17, wherein the breaker is an encapsulated enzyme.

* * * * *